United States Patent [19]
Hayes

[11] 3,779,543
[45] Dec. 18, 1973

[54] SHEET MATERIAL CONVEYOR

[75] Inventor: Leonard L. Hayes, Lewiston, Idaho

[73] Assignee: Potlatch Forests, Inc., San Francisco, Calif.

[22] Filed: Dec. 27, 1971

[21] Appl. No.: 212,085

[52] U.S. Cl. .................................. 271/75, 271/68
[51] Int. Cl. ............................................ B65h 29/16
[58] Field of Search ................. 198/165, 162, 75, 198/160, 167; 271/75, 68; 214/60 K

[56] References Cited
UNITED STATES PATENTS
2,862,606  12/1958  Schlichting ..................... 198/165
3,622,150  11/1971  Hayes ............................. 271/68

Primary Examiner—Richard E. Aegerter
Attorney—Wells, St. John & Roberts

[57] ABSTRACT

An apparatus for uniformly controlling the upward arch of wood veneer as it is moved longitudinally by a conveying means from a feeding device, which initiates the arched configuration, to plural release mechanisms. The apparatus consists mainly of an endless belt which frictionally engages the uppermost surface of arched sheets and maintains contact as the sheets move to the above-mentioned release mechanisms. The lower course of the belt is transversely arched for rigidity.

2 Claims, 7 Drawing Figures

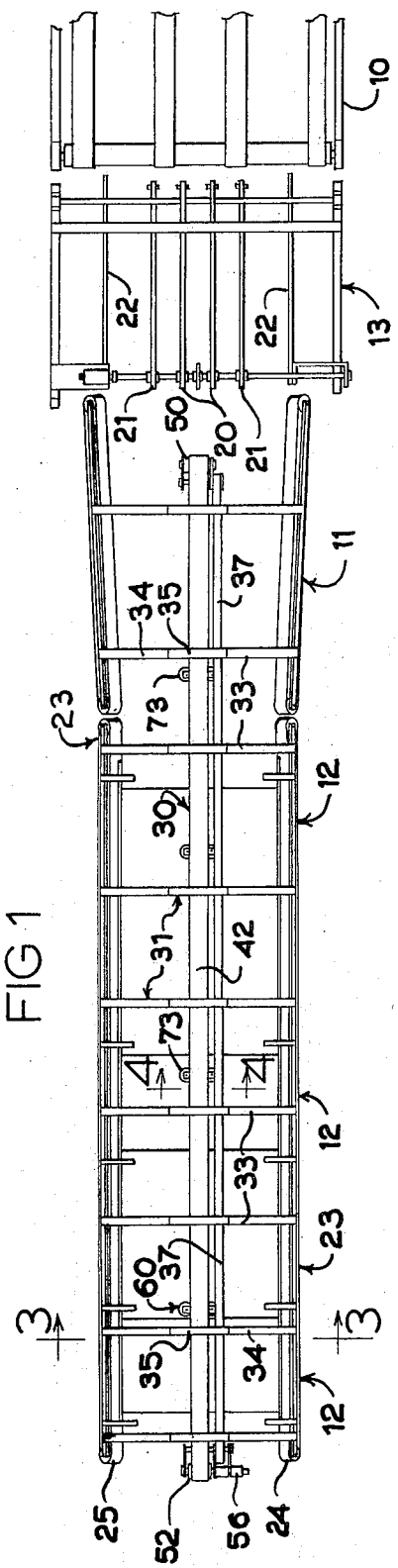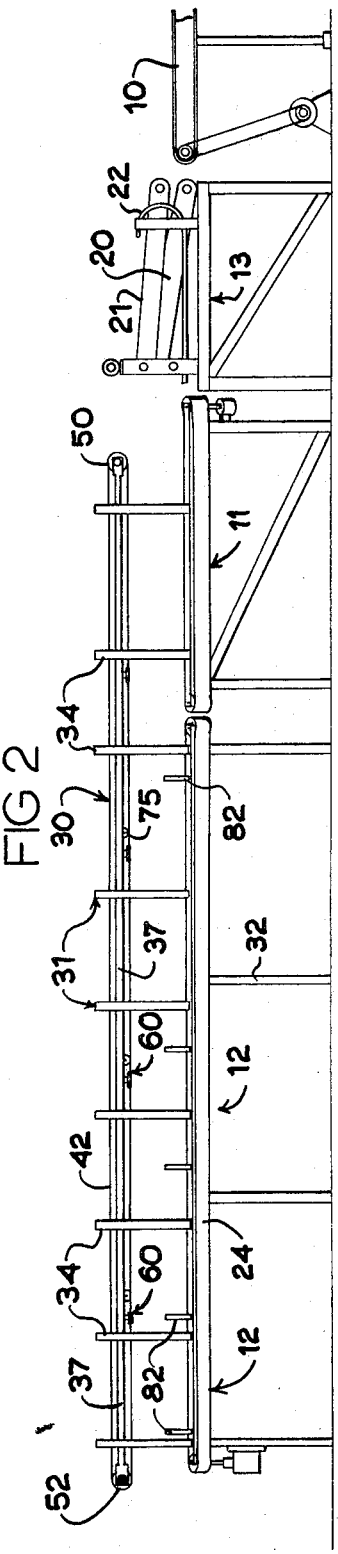

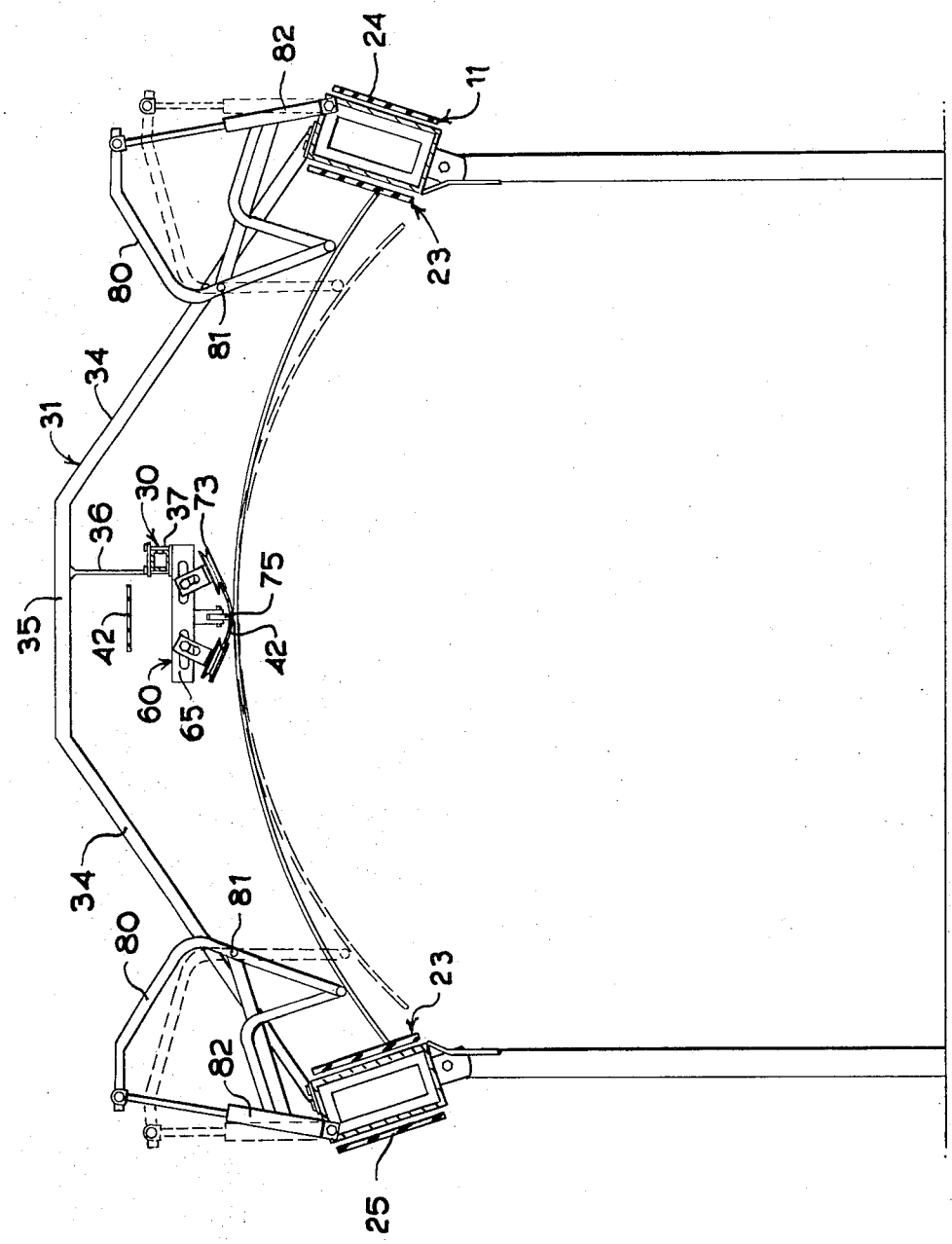

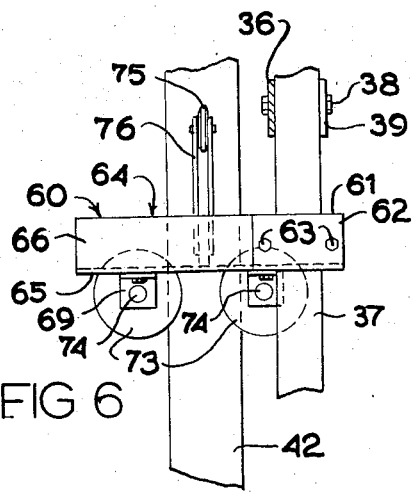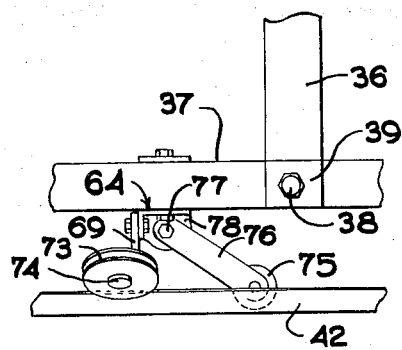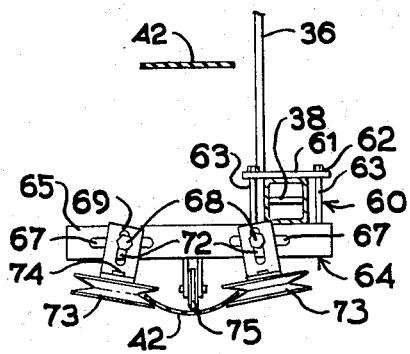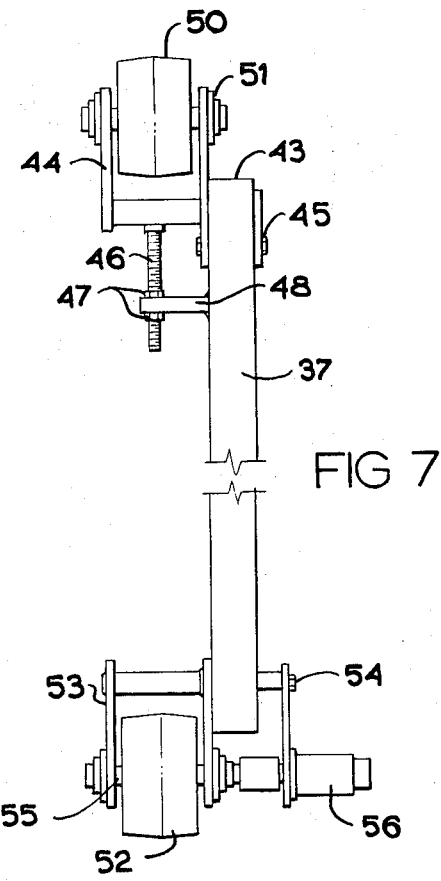

SHEET MATERIAL CONVEYOR

BACKGROUND OF THE INVENTION

The present veneer arch controlling apparatus was designed particularly for use on sheet stacking devices (used in plywood and veneer manufacturing processes) which convey sheets in an upwardly arched configuration to stacking stations. The apparatus has utility in other applications wherein rectangular sheets, without uniform thickness or having other characteristics which prevent uniform arching, must be conveyed in a uniformly arch configuration.

In the plywood industry, veneer is peeled from a log and directed along multiple conveyors to a clipper. The clipper is used to trim each sheet to the maximum usable width permitted by the nature of the wood veneer. All veneer sheets are produced with substantially the same length, the length of each sheet being transverse to the conveying devices. The sheets of wood veneer in their initial "green" state must then be stacked for later use, generally being arranged according to width and quality.

The operation of the apparatus disclosed is accomplished by a conveyor including a pair of endless belts having upright flights that face one another. A feed mechanism at the infeed ends of the belts arches each veneer upwardly in a transverse orientation (parallel to the wood grain in the case of wood veneer sheets) and directs each sheet to the belts, where the side edges of the sheets are frictionally engaged by the belt surfaces. Longitudinal guides are provided inward of the belts to assist in maintaining the sheets in proper position as they move along the length of the conveyor. One or more stacking assemblies are located along the belts, each having a receiving means under the belts. Release means are provided above each stacking assembly for engaging each sheet and releasing it from contact with the moving belts.

Certain characteristics such as uneven thickness, knots, pitch pockets, etc., are not uncommon to wood, and their eventual appearance in veneer sheets tend to distort a normally uniform arched configuration. Such distortion creates unequal stress at each side edge and thereby affects the direction of fall when both side edges are released simultaneously at the stacking stations. The resulting stack of veneer is uneven and a problem to handle.

The lack of uniformity in the sheets is accommodated, according to the present disclosure, by a third guide or conveyor centered between the belts and frictionally engaging the upper surface of each transversely-arched sheet. This guide is preferably in the form of a frictional belt which itself is transversely arched to impart rigidity to it. The belt is powered at a speed equal to that of the upright flights which engage the side edges of the sheets. It maintains a controlled arch across each sheet and prevents transverse slippage or movement of the center of each sheet when released from the flights by being pushed inwardly.

SUMMARY OF THE INVENTION

The present invention basically comprises the combination of a pair of powered endless belts including transversely spaced upright flights facing one another and adapted to engage the side edges of transversely-arched sheets, together with a central longitudinal conveyor in the form of a belt located between said flights. The conveyor includes a lower course at an elevation such as to engage the upper surface of the arched sheets between the flights. The belt is powered in such fashion as to move the lower course at a speed equal to that of the flights. The belt preferably has parallel side edges and is guided by elements spaced apart a distance less than the belt width, whereby the lower course of the belt is maintained in a transversely-arched condition with a convex transverse configuration presented at the bottom thereof.

It is a first object of this invention to provide a mechanically simple device for controlling the arched configuration of sheets held between upright flights of endless conveyors, while presenting minimum obstruction between the flights for access and observation purposes.

Another object of this invention is to provide such a guide which can be adjustably set to exert sufficient downward force on the upper surface of each sheet so as to maintain uniformity in the arch of each sheet and prevent side slippage of the sheets when released inwardly from the belt flights.

Another object of the invention is to provide unique guide elements along the central belt so as to maintain vertical rigidity in the belt and a uniform elevation along the full length of its downwardly-facing course.

These and further objects will be evident from the following disclosure, taken along with the accompanying drawings, which illustrate a preferred form of the invention.

DESCRIPTION OF THE DRAWINGS

FIG. 1 is a plan view of the conveyor in conjunction with a sheet stacking and conveying apparatus for veneers;

FIG. 2 is a side view of the conveyor and stacking apparatus shown in FIG. 1;

FIG. 3 is an enlarged vertical cross-sectional view taken along line 3—3 in FIG. 1;

FIG. 4 is an enlarged cross-sectional view taken along line 4—4 in FIG. 1;

FIG. 5 is a side view of the device as seen in FIG. 4;

FIG. 6 is a sectional view of the belt guides as seen along line 6—6 in FIG. 4; and FIG. 7 is a fragmentary plan view illustrating the end journals for the conveyor.

DESCRIPTION OF THE PREFERRED EMBODIMENT

The structure described below will be discussed in terms of an apparatus for handling sheets of green veneer. It is designed specifically for such sheets, which are relatively thin and normally of considerable dimension. The length of such veneer is typically slightly more than 8 feet, this length being located in a transverse direction relative to the conveyor assemblies along which it travels. The width of each sheet is clipped to various dimensions, typically widths of 54 inches, 27 inches, and miscellaneous random widths necessitated by veneer peculiarities.

The apparatus is designed specifically for veneer production, but can be readily envisioned as a conveying, stacking and sorting device for other sheet materials having a constant width across the conveyor. So, while the description will refer to "veneers" it is to be borne in mind that the sheets handled by the apparatus can be of other than wood materials.

As seen in FIGS. 1 and 2, a sheet conveying and stacking means is utilized at the exit end of a supply conveyor 10. A sheet conveyor assembly is shown generally at 11, leading past a series of sheet stacking stations shown at 12. The sheet material is moved longitudinally (from right to left) with respect to FIGS. 1 and 2 along conveying assembly 11 in a self-supporting transversely-arched configuration. The sheets are then vertically stacked according to width at successive stacking stations 12.

Feed mechanism 13 located between the supply conveyor 10 and the sheet conveyor 11, initiates a transition from the flat position of the sheets on supply conveyor 10 to a transversely self-supporting arched condition. The feed mechanism is comprised of a central pair of conveyors 20 and an outer pair of conveyors 21 which cooperate with edge guide extensions 22 to properly shape each sheet entering the sheet conveyor assembly 11.

The sheet conveyor assembly 11 includes a substantially horizontal conveyor 23 for moving the arched veneer sheets to stacking stations 12. The conveyor 23 includes two opposing parallel belts 24 and 25 that are mounted at an inclined upright position for engaging the supporting side edges of the sheets. The belts are spaced at a distance less than the length of the sheets so the upward arch of the sheets may be maintained through the distance of the stacking stations 12. The uniformity of the upward arch of the sheets is maintained by a hold-down conveyor 30.

Hold-down conveyor assembly 30 is centrally located between the belts 24 and 25 of the sheet conveyor 11 and runs longitudinally from the exit end of feed conveyor 13 to the end of sheet conveyor 11, and is suspended by framework 31. Framework 31 is structurally mounted to the sheet conveyor assembly frame 32 and comprises plural cross members 33, each having angular legs 34 and horizontal members 35. Horizontal members 35 rigidly support perpendicular hanger bars 36 which extend downwardly to provide support means for a longitudinal conveyor supporting channel 37.

Supporting channel 37 is located adjacent to the longitudinal center of the sheet conveyor 11 and is mounted perpendicular to framework members 31 by bolts 38 extending through end plate 39, supporting channel 37 and hanger bars 36. Hold-down conveyor 30 comprises an endless belt 42 running longitudinally along the center of sheet conveyor 11 and the uppermost surface of the arched sheets. Endless belt 42 is necessarily of rubber fabric or other material suitable for frictionally engaging the uppermost surface of arched veneer sheets without damaging effects.

A tension adjusting bracket 44 is slidably mounted to the rear end 43 of supporting channel 37 by a bolt 45 extending through channel 37 to a slot (not shown in drawings) in adjusting bracket 44. An adjusting screw 46 is rigidly mounted to tension adjusting bracket 44 and threadably communicates with nuts 47 located on either side of stop 48. Stop 48 is rigidly mounted to channel 37 and allows adjusting screw 46 free longitudinal movement through a hole (not shown in drawings) of a diameter somewhat larger than that of the adjusting screw. The tension adjusting bracket is capable of movement along the axis of adjusting screw 46 by loosening one of the nuts 47, while tightening the other.

Idler roller 50 is rotatably carried by bearings 51 which are rigidly attached to tension adjusting bracket 44.

Endless belt 42 wraps around idler roller 50 and extends to the front end of supporting channel 37 where it is powered by end roller 52. End roller 52 is rotatably carried by bracket 53 which is rigidly attached to supporting channel 37 by bolt 54. Axle 55 of roller 52 is rotatably journalled by bearings and communicates with a power means 56 capable of maintaining belt speeds equal to that of conveyor 23.

FIGS. 4, 5 and 6 illustrate in detail, one of the plural belt training devices 60 located along the length of supporting channel 37 and the lower course of endless belt 42. Each belt training device is supported on channel 37 by clamp 61 comprising top plate 62 and bolts 63 located at either of the verical sides of channel 37. Bolts 63 threadably engage perpendicular angle bar 64. Angle bar 64 comprises a vertical surface 65 and a horizontal surface 66. Vertical surface 65 contains two elongated slots 67. Elongated slots 67 accept bolts 68 which adjustably mount L-shaped pulley brackets 69. Slots 72 in the vertical portions of pulley brackets 69, combined with slots 67 in the supporting angle bar 64, add horizontal, vertical and angular adjustability, in the plane of vertical surface 65, to the pulleys 73. Pulleys 73 are rotatably fixed to pulley brackets 69 through shafts 74. The pulleys 73 are spaced somewhat apart, a distance less than the width of endless belt 42 to maintain a transverse downward arch along the length of the lower course of the belt, and to maintain the vertical alignment of the belt on rollers 50 and 52. This arch is reinforced by a roller 75 rotatably fixed to extended arm 76. Bolt 77 extends through arm 76 and mounting ear 78 to adjustably attach roller 75 and arm 76 to angle bar 64.

The transverse arch is maintained through the length of the lower course of endless belt 42 by the plurality of training devices 60. The number of training devices required is determined by the length of travel of the endless belt 42.

The transverse arch lends some longitudinal rigidity to the belt in addition to that which is induced by tension from the idler pulley adjusting bracket 44 to belt 42. This creates a resistance to vertical bend which is used to apply a steady downward force by the belt 42 against the uppermost surface of the arched veneers as they move along conveyor 23 of the sheet conveyor 11. The downward force by the arched belt tends to maintain uniformity in the arched configuration of the veneer sheets, thus somewhat equalizing the outward forces exerted at the side edges of the sheet. With equal outward forces at the veneer side edges, the fall of a released sheet is substantially vertical. The release of a sheet is illustrated in FIG. 3.

FIG. 3 illustrates, in dotted lines, the release of a veneer sheet by opposed push bars 80 pivoting about pins 81 and powered by cylinders 82. The side edges of the veneer sheet are forced down and inwardly by the push bars 80 while the hold-down conveyor 30 maintains the uniformity of the arched configuration of the sheet through the process. The sheet then falls freely into a vertical pile.

The fundamental concept involved in this disclosure is the provision of a conveyor system to induce and maintain uniformity in the arched configuration of veneer sheets as they move in a self-supporting arch on a sheet conveyor assembly to their respective stacking stations.

Modifications can obviously be made in the specific features shown and therefore the foregoing discussion is not intended to limit or restrict the scope of the application, the invention being set out in the following claims.

Having thus described my invention, I claim:

1. A sheet conveying apparatus comprising:

a longitudinal support framework;

a pair of powered transversely spaced endless belts including upright flights facing one another;

feed means for transversely arching individual sheets upwardly and causing engagement of the transverse edges of each sheet by said upright flights;

a longitudinal endless conveyor mounted on said framework and located centrally between said belts, including a lower course at an elevation such as to engage the upper surface of the arched sheets between the belts;

and power means operatively connected to said conveyor for moving said lower course at a speed equal to that of said flights.

2. An apparatus as set out in claim 1 wherein said endless conveyor comprises an elongated belt having parallel side edges;

said lower course of the belt being transversely arched throughout its length by engagement of its side edges between guide elements spaced apart a distance less than the belt width.

* * * * *